United States Patent [19]

Kleiner et al.

[11] 4,398,394
[45] Aug. 16, 1983

[54] PROCESS FOR PREPARING GASIFIED ICE OF IMPROVED STABILITY

[75] Inventors: Fredric Kleiner, Valley Cottage, N.Y.; William R. Ramakka, Little Ferry, N.J.; Valery B. Zemelman, Wilton, Conn.

[73] Assignee: General Foods Corporation, White Plains, N.Y.

[21] Appl. No.: 326,887

[22] Filed: Dec. 2, 1981

[51] Int. Cl.$^3$ .............................................. F25C 1/00
[52] U.S. Cl. .............................................. 62/1; 62/69
[58] Field of Search ........................... 62/1, 48, 69, 70

[56] References Cited

U.S. PATENT DOCUMENTS

| | | | |
|---|---|---|---|
| 2,575,509 | 11/1951 | Bayston | 62/1 X |
| 2,584,875 | 2/1952 | Hasche | 62/1 |
| 2,800,456 | 7/1957 | Shepherd | 62/1 X |
| 2,975,603 | 3/1961 | Barnes et al. | 62/1 |
| 3,086,370 | 4/1963 | Barnes et al. | 62/1 |
| 3,217,503 | 11/1965 | Mitchell et al. | 62/48 |
| 3,220,204 | 11/1965 | Adler et al. | 62/70 |
| 3,255,600 | 6/1966 | Mitchell et al. | 62/69 |
| 3,333,969 | 8/1967 | Mitchell et al. | 99/192 |
| 4,333,315 | 6/1982 | Zemelman et al. | 62/1 |
| 4,347,707 | 9/1982 | Zemelman et al. | 62/1 X |

OTHER PUBLICATIONS

H. W. Herreilers *Het Systeem $Co_2$-$H_2O$*, Ph.D. Thesis, University of Amsterdam, 1936, (English translation of title page and Chapter VIII, "Summary").

Copending U.S. patent application, filed concurrently by Hinman et al., entitled Carbonated Ice Process and Product.

Miller and Smythe "Carbon Dioxide Clathrate in the Martian Ice Cap." *Science* 170 Oct. 30, 1970, pp. 531–533.

Adamson and Jones "Physical Adsorption of Vapors on Ice" *Journal of Colloid and Interface Science* 37(4) 1971, pp. 831–835.

*Primary Examiner*—William E. Tapolcai
*Attorney, Agent, or Firm*—Joyce P. Hill; T. R. Savoie; D. J. Donovan

[57] ABSTRACT

Water ice is contacted with a conditionally-stable-hydrate-forming gas to form a hydrate complex of the gas, and is then enrobed in a frozen aqueous liquid to increase structural and storage stability. According to a preferred embodiment, carbon dioxide hydrate is formed by contacting solid water ice with gaseous carbon dioxide; the hydrate is wetted with a carbon-dioxide-saturated aqueous liquid; and the resulting wetted hydrate is frozen.

16 Claims, No Drawings

PROCESS FOR PREPARING GASIFIED ICE OF IMPROVED STABILITY

TECHNICAL FIELD

The present invention relates to the preparation of gasified ice products; and particularly, to improvements which provide products of this type characterized by high gas contents, good mechanical strength, prolonged storage stabilities suitable for commercial distribution in the frozen state, and vigorous, uniform release of gas when placed in an aqueous liquid.

Gasified ice products are known which, due to the binding of the gas within a gas hydrate complex, have enabled delivery of high volumes of gas from relatively small volumes of ice. These products have shown potential for storage and transport of gases of many types. Typically, the gas will be carbon dioxide, and the product will be employed to carbonate an aqueous liquid in the simplified home preparation of carbonated beverages. For the greatest economy and convenience, it is desirable to incorporate high levels of gas.

Gasified ice products have been prepared by a number of distinct processes. According to one process, an aqueous liquid is contacted with gas under high pressure for a time sufficient to form a desired level of gas hydrate, and the resulting suspension of gas hydrate and aqueous liquid is then frozen. According to another prior art procedure, liquid carbon dioxide has been employed to contact either liquid water or water ice at temperatures below −25° C., prior to freezing the entire reaction mixture. According to yet another known procedure, water ice has been contacted with a conditionally-stable-hydrate-forming gas at temperatures below the freezing point of water, with contact being maintained for a period of time effective to produce the desired level of gas hydrate.

While recent improvements have made the procedures employing contact at temperatures above the freezing point more efficient and productive of more stable products, and have increased efficiencies for the gas-solid reactions below the freezing point of water, significant problems remain for this latter class of reactions in terms of achieving suitable stability for commercial storage and distribution.

BACKGROUND ART

Barnes et al in U.S. Pat. Nos. 2,975,603; 3,086,370; and 3,217,503 disclose processes for preparing ice products containing from about 25 to about 120 milliliters of carbon dioxide, or other suitable conditionally-stable-hydrate-forming gas, per gram of frozen product. According to one aspect of these related disclosures, carbonated ice was prepared by subjecting aqueous liquid to a carbon dioxide pressure of at least about 200 psig and preferably less than 600 psig; maintaining the aqueous liquid and the carbon dioxide in contact for a time sufficient to permit absorption in the liquid of carbon dioxide in bound form; and freezing the reaction mixture which contained carbon dioxide hydrate crystals suspended within unreacted aqueous liquid.

Alder et al, in U.S. Pat. No. 3,220,204, state that while the prior art procedures of Barnes et al produced products which would retain a high level of carbonation during frozen storage, the products had a tendency to explode or pop during dissolution of the product to release the gas. Alder et al indicate that when the Barnes et al carbonated ice products were added to water or milk, they would frequently explode in the glass. To correct this, Alder et al subjected a thin film of water to carbon dioxide gas at a pressure and temperature above the eutectic point of the water, the temperature being low enough to form a hydrate. They stated that, as a practical matter, in order to operate under controllable conditions, hydrate should be produced at a pressure above 200 psig and at a temperature above 0° C., in order to maximize hydrate formation while minimizing collateral formation of water ice. After suitable hydrate formation, the reaction mixture containing water and hydrate crystals was frozen at a temperature below −3° C.

In U.S. Pat. No. 3,255,600 to Mitchell et al, there is disclosed a process for forming carbonated ice wherein liquid carbon dioxide and liquid water or water ice are mixed under controlled conditions. The patentees indicate that they discovered that liquid carbon dioxide results in a more rapid formation of the product while permitting more accurate control of the operating conditions. It has been our experience, however, that the use of liquid carbon dioxide requires the use of great quantities of energy and produces a product which loses significant gas content before it can be commercially distributed; and it has the popping and cracking problems associated with the earlier prior art.

Throughout this evolution of gasified ice products involving reactions above the freezing point of water, Mitchell et al disclose in U.S. Pat. No. 3,333,969, that the problem of uneven release of other gas had persisted. Mitchell et al focused on a method for subdividing carbonated ice into discrete particles while maintaining the temperature of the ice below 0° C., and then compacting the discrete particles to form them into an adhered mass or briquette to eliminate the explosive release of carbon dioxide during carbonation. This process actually resulted in a decrease in final gas content.

In a departure from the above techniques, which carry out the content between the conditionally-stable-hydrate-forming gas and the water at temperatures above 0° C., it is disclosed in co-pending U.S. patent application, Ser. No. 326,888 entitled, "Carbonated Ice Product and Process," filed by Hinman et al. concurrently with the present application, that a carbonated ice product could be efficiently prepared by contacting water ice with carbon dioxide at a temperature below 0° C. That application discloses the discovery that when the conditions of contact are controlled to maintain the water ice in the frozen state and the carbon dioxide in the gaseous state, a commercially satisfactory rate of reaction is noted at temperatures just below the freezing point of water. That discovery for the first time makes it possible to practically utilize the product of the reaction between water ice and a gaseous conditionally-stable-hydrate-forming gas, for utilization in a commercial process. Prior to that time, Miller and Smythe in *Science*, Vol. 170, October 1970, pages 531–533, disclosed the formation of a carbon dioxide hydrate by a gas-solid process at temperatures of from −73° to −43° C. as part of their study of the kinetics of decomposition at temperatures of from −121° to −101° C. Miller and Symthe determined a temperature-dependent decomposition rate which, if extrapolated to the temperature range normally encountered during commercial and home freezer storage, would indicate an entirely unsatisfactorily high rate of decomposition. The results of Miller and Smythe were later found to be consistent with the work of Adamson and Jones in a study published in the *Journal of Colloid and Interface Science*, Vol. 37, No. 4, December 1971, pages 831–835. Adamson and Jones also dealt with temperatures of less than −73° C. Thus, the work disclosed by Hinman et al. in the above-identified co-pending patent application was surprising in that the rate of reaction dramatically increased within a narrow temperature range just below 0° C. However, the Hinman et al. product is less stable than would be desired for a commerical product, especially one intended for distribution over a large geographical area for which an extended shelf life would be necessary.

It is apparent from the foregoing discussion of the prior art that the problem of providing a gasified ice product having a shelf life suitable for commercial distribution in the frozen state, and an even evolution of gas upon melting, have been significant concerns. For gasified ice products prepared by techniques other than gas-solid contact, significant progress has been made in addressing these concerns. However, gasified ice products prepared by gas-solid contact are presently in need of significant improvement, especially in the area of storage stability.

DISCLOSURE OF INVENTION

In accordance with the present invention, we provide an improved process for preparing gasified ice products by gas-solid content. The products are characterized by a high degree of mechanical strength in the frozen state, high gas content, prolonged storage stabilities suitable for commercial distribution in the frozen state, and a vigorous, uniform effervesence when placed in water. Also provided is the product of that process.

In its broad aspects, the process comprises: contacting ice with a conditionally-stable-hydrate-forming gas under conditions of temperature and pressure capable of forming a chemical hydrate complex of the gas, said temperature being below the freezing point of water and said pressure being at least sufficient to enable formation of said hydrate but insufficient to liquefy said gas at the temperature of contact; maintaining the said contact for a period of time effective to form gas hydrate complex within said ice; contacting said water ice containing gas hydrate, under conditions of temperature and pressure effective to maintain said hydrate in stable form, with a sufficient amount of aqueous liquid to wet all exposed surfaces of said ice; and freezing said aqueous liquid to enrobe said ice containing gas hydrate.

Among the gases which are capable of forming conditionally-stable hydrates are those which form hydrates which appear to be characterized by a loose bond between the gas and water under controlled conditions of temperature and high pressure. All of the suitable gases exist in the gaseous state at atmospheric pressure at temperatures above 0° C., as well as all of the conditions encountered during contact. Additionally, these gases combine with water to form gas hydrates containing from about 5.75 to about 6 or more moles of water per mole of gas. The hydrates are further characterized by their ability to be stored in essentially stable condition at ambient pressure and temperatures below about 0° C. and then be decomposed by melting in an aqueous liquid.

Specifically identified as gases capable of forming conditionally-stable hydrates are various oxides of nonmetals, typically nitrous oxide; sulfur-containing gases, including hydrogen sulfide; chlorine-containing gases, including chlorine and methylene chloride; various inert gases such as helium, argon, krypton and neon; carbon monoxide; and carbon dioxide. Preferably, the gas will be selected from the group consisting of these, and most preferably will comprise carbon dioxide, nitrous oxide, or chlorine, due to their adaptability to the process and the widespread utilities. While not intending to be bound to the specific example of carbon dioxide, much of the detail of the following disclosure of the invention will focus on this as exemplary, due to its ready adaptability to use in preparing carbonated beverages for which there appears to be an immediate commercial opportunity.

In carrying out the process of this invention, the ice in the form of loose or compacted powder and the aqueous liquid employed to enrobe the ice after the reaction with the conditionally-stable-forming-gas, will preferably be essentially pure water or a saturated solution thereof with the particular gas. Although some advantages in terms of reproducibility of precise conditions and stability of the final product may be obtained by using distilled or deionized water, the process of the present invention is not limited to these. The person of ordinary skill in the art may employ various types of solutions, and in the case of food products such as beverages, various materials including sugar, color, flavor, acidulents, and the like, knowing that they may decrease ease of process control or affect the stability of the final product. Thus, the terms water, ice and aqueous liquid will be hereinafter employed to include the appropriate form of water or water ice containing added materials such as those mentioned, as well as water or water ice per se.

The process of this invention is capable of improving the mechanical strength and storage stability of gas hydrate produced by any solid water ice-gas contact procedure. However, because the efficiency of the procedure disclosed in the above-identified Hinman et al. patent application so far exceeds that attainable by prior art procedures, the following detailed description will focus upon this method of preparation as exemplary. Hinman et al. is limited to the preparation of carbonated ice using gaseous carbon dioxide; however, no such limitation is imposed on this invention. In fact, any conditionally-stable-hydrate-forming gas can be employed in the preparation of a gas hydrate. Further, the gas hydrate complex which is stabilized by the process of this invention is referred to interchangeably as a "gas hydrate ice" or an "ice containing gas hydrate" and is to be distinguished from the water ice or frozen aqueous liquid which enrobes the gas hydrate complex.

BEST MODE FOR CARRYING OUT THE INVENTION

The present invention makes practical use of the discovery that gas hydrates formed by contacting solid water ice with a conditionally-stable-hydrate-forming gas can be enrobed with a protective coating of water ice under controlled conditions to obtain increased physical and chemical stability.

In the initial stage in processing, ice is contacted with a conditionally-stable-hydrate-forming gas under conditions of temperature and pressure capable of forming a chemical hydrate complex of gas. The temperature will be below the freezing point of water, and the pressure will be at least sufficient to enable formation of hydrate but insufficient to liquefy the gas at the temperature of contact. Preferably, the gas will comprise carbon dioxide and the contact between the ice and carbon dioxide will be conducted at a temperature within the range of from about −20° to 0° C. at a pressure of from about 0.3 to 0.99 times the vapor pressure of carbon dioxide at the temperature of contact.

The ice will preferably be formed continuously or semi-continuously by commercial snow-making or ice-making equipment. Where ice is formed as cubes or other large pieces, it is preferred to increase the specific surface of the ice by grinding, crushing, shaving, or otherwise comminuting. Preferably, the ice will be in the from of particles small enough so that substantially all pass through a 20-mesh U.S. Standard sieve, and more preferably through a 325 mesh U.S. Standard sieve. The specific surface of the particles is preferably greater than about 80 square centimeters per gram of bulk ice and more preferably greater than about 1500 square centimeters per gram of bulk ice. The volume of bulk ice will comprise the volume of solid ice plus any void space. Thus, the term "solid ice" means only the actual volume of ice within the product, excluding all void space within the high-specific-surface bulk ice.

In the initial stage of contacting the ice with the gas, the reaction temperature is important because the reaction rate increases dramatically just below the freezing point of ice in comparison with forming the hydrate at lower temperatures, e.g., −70° to −40° C. The pressure, on the other hand, is less of a factor once a threshold value is achieved beyond which the rate of reaction is diffusion-controlled.

The initial contact step is carried out in any reactor capable of withstanding the pressures and temperatures required. Typically, the ice will be charged into a pressure reactor at a temperature below the freezing point, and preferably within a few degrees of the selected temperature of contact of between −20° and 0° C. Preferably, the temperature during this initial contact is maintained within the range of from −14° to −2° C.

The pressure during contact will be within the range of from about 0.3 to 0.99 times the vapor pressure of $CO_2$ at the selected contact temperature, and will be at a level at least sufficient to cause formation of carbon dioxide hydrate, but insufficient to liquefy the carbon dioxide. The contact pressure must be above the threshold value for reaction at the temperature of contact, this threshold value is calculated as being 0.3 times the vapor pressure of carbon dioxide at the contact temperature and is essentially defined by the equilibrium line between the gaseous carbon dioxide-solid water and the gaseous carbon dioxide-solid water-carbon dioxide hydrate regions as defined by the $CO_2$-water-hydrate phase diagram described by H. W. Herreilers, Ph.D. Thesis, University of Amsterdam (1936). Typically, there is no discernable effect of pressure on either the kinetics of the reaction or the composition of the reaction mixture. In cases where the pressure is raised gradually, there is no hydrate formation until the equilibrium line on the phase diagram is crossed. At this point, carbon dioxide hydrate formation proceeds smoothly, following a diffusion-limited rate curve to a point of completion corresponding approximately to the composition $CO_2.6H_2O$. Some experiments have approached the theoretical value of $CO_2.5.75H_2O$. Further increases in the pressure do not result in additional carbon dioxide gain. Moreover, increases in the pressure to greater than the carbon dioxide condensation line on the noted phase diagram will result in the formation of liquid carbon dioxide and should be avoided to achieve the best product uniformity and economics of the reaction.

The contact between the gaseous carbon dioxide and the ice is maintained for a period of time effective to form carbon dioxide hydrate in the ice. The exact time required for hydrate formation at a sufficiently practical level for uses such as carbonating beverages, depends upon a number of factors including the temperature of contact and the specific surface of the ice, as detailed above, as well as the geometry of the particular reaction vessel.

Because one of the objects of the invention is to prepare gasified ice products having high gas contents, the contact between the gaseous carbon dioxide and the ice is preferably maintained for a period of time effective to achieve a level of carbon dioxide hydrate sufficient to provide at least 25 milliliters of carbon dioxide gas per gram of solid ice, the volume of carbon dioxide being measured by evolution and measurement at standard conditions of temperature and pressure. Preferably, the contact will be maintained for a period of time effective to form sufficient carbon dioxide hydrate to provide a product containing at least 50 volumes of carbon dioxide per gram of solid ice. It is an advantage of the noted Hinman et al. invention, that carbon dioxide levels of greater than 100, and as high as from 120 to about 150, milliliters of carbon dioxide per gram of solid ice can be achieved. Practical levels of hydrate formation are typically achieved within a time of from about 5 minutes to about 2 hours of contact.

After preparation of the ice containing gas hydrate, preferably carbon dioxide hydrate, the ice is contacted with a sufficient amount of aqueous liquid to wet all exposed surfaces of the ice, and the aqueous liquid is then frozen to enrobe the ice containing the gas hydrate. Because the gas hydrate seeks to establish an equilibrium with its surroundings, it is preferred that the aqueous liquid employed to contact and wet the ice containing gas hydrate comprise a solution which is saturated with the particular conditionally-stable-hydrate-forming gas. The gas-saturated water coating minimizes loss of entrapped gas due to decomposition which would otherwise occur to an extent necessary to fully saturate the enrobing liquid. However, tap water and water from other sources are contemplated as suitable for enrobing the gas hydrate as described herein. The temperature and pressure during contact between the aqueous liquid and the ice containing gas hydrate should be conducted at a combination of temperature and pressure within the stable hydrate region, such as that for carbon dioxide hydrate defined in the above-noted phase diagram of Herreilers.

The contact between the aqueous liquid and the powdered or compacted ice containing gas hydrate can be accomplished in any suitable manner such as by spraying, or by immersion of the ice within the aqueous liquid. When immersing the hydrate in an aqueous liquid, sufficient contact is made by agitation to assure complete wetting of all exposed surfaces of the ice. Most preferably, the ice containing gas hydrate is immersed in the aqueous liquid by adding the aqueous liquid at a suitable temperature within the range of from about −2° C. to about 11° C. and a suitable pressure within the range of from about 170 to 660 psig into a pressurized vessel. The gas hydrate ice is also preferably maintained under the conditions of temperature and pressure stated above to maintain the gas hydrate in its stable form. The water/gas hydrate contact typically results in the replacement of gas in void spaces between ice particles prior to freezing the entire mass. Typically, freezing temperatures on the order of from about −5° to −20° C. will be effective. Pressure should be maintained upon the mixture of gas hydrate ice and aqueous liquid until freezing is complete to prevent destabilization of the gas hydrate. If desired, the mixture can be frozen in a suitably-shaped mold to yield a structurally strong product in the desired shape.

The carbonated ice prepared in the above manner can be packaged in a suitable container such as a can or styrofoam cup. When packaged in containers of this type, the carbonated ice will provide a high degree of storage stability at ambient pressure and at temperatures within the range of from about −5° to about −20° C. for time periods of fromm 4 to 8 months, and preferably in excess of 6 months.

Along with the carbonated ice, in the same package or in a separate adjoining package, there may be provided a composition for preparing a soft drink such as the kind which comprises a color, flavor, an edible acidulent, and a sweetener, all of these ingredients being present in amounts effective to provide the desired taste and eye appeal.

The following example is presented for the purpose of further illustrating and explaining the present invention and is not to be taken as limiting in any regard. Unless otherwise indicated, all parts and percentages are by weight, based upon the weight of the product or reactants at the indicated point in processing.

EXAMPLE

This example describes the preparation of a stable carbonated ice product according to the present invention wherein ice containing carbon dioxide hydrate is first prepared and then stabilized by enrobing it with a coating of carbon dioxide-saturated ice.

In a first bomb reactor, 97.2 grams of granulated ice having particles small enough so that substantially all pass through a 200-mesh U.S. Standard sieve, is contacted with carbon dioxide gas at a pressure of 342 psig and a temperature of about −11° C., for a total contact time of about 18 hours. In a second bomb reactor, a carbon dioxide saturated solution of water is prepared under conditions that avoid hydrate formation at a temperature of about 8° C. and a pressure of about 350 psig, by agitating the reactor contents for 3 hours until the temperature of the reactor contents matches the temperature of a continuous temperature bath within which the reactor is held. At this point, the first and second bomb reactors are placed into a bath having a temperatuure of about 1° C. The bomb reactors are interconnected. When the temperatures of the reactors reach the same value, the pressure in the second reactor, containing the saturated carbon dioxide solution, is increased by 50 psig to transfer 200 milliliters of the carbon dioxide saturated solution to the first reactor. The contents of the first reactor, namely the ice containing carbon dioxide hydrate and the saturated solution of carbon dioxide, are then agitated to mix the water and ice thoroughly. The temperature is noted to rise to just under 5° C. for a short period of time. The contents of both bomb reactors are then frozen at a temperature of about −11° C. Upon analysis, the product ice, a solid mass, is seen to contain about 70 cubic centimeters of carbon dioxide per gram of solid ice when measured under conditions of standard temperature and pressure. When stored for 22 days under conditions of −12° C. and ambient pressure the product still exhibits a carbon dioxide content of 58 cubic centimeters per gram of ice when measured under conditions of standard temperature and pressure.

For comparative purposes, but not as an example of this invention, ice particles small enough so that substantially all pass through 100 to 200 U.S. Standard mesh sieves are reacted to form a gas hydrate under conditions similar to those above, but the ice containing carbon dioxide hydrate is not stabilized by enrobing in the frozen saturated solution of carbon dioxide. Upon analysis initially, the ice particles show 95 cubic centimeters of carbon dioxide per gram of ice when measured under conditions of standard temperature and pressure. After storage for about 24 hours under the same conditions as employed above, the carbon dioxide content of the sample is 25 cubic centimeters per gram of ice when analyzed at conditions of standard temperature and pressure. The ice particle size used in this comparative process is larger than the particle size in the Example. The rate of carbon dioxide loss is also slower for the larger particles of ice. Therefore, the loss of more than 70 percent of the carbon dioxide content in 24 hours for the non-stabilized 100–200 U.S. Standard mesh particles would be even greater for the product of the Example having less than 200 U.S. Standard mesh particle size, if the product of the Example were not enrobed with water ice. Thus, the surprising and unexpected advantage of the present invention is that it greatly improves the storage stability of the carbonated ice product. Moreover, the physical strength of the carbonated ice product is improved by the present invention, making it more adaptable to survive the rigors of commercial handling and distribution.

The above description is for the purpose of teaching persons skilled in the art how to practice the present invention. It is not intended to detail all of the obvious modifications and variations of the invention which will become apparent to the skilled worker upon reading. However, applicants do intend to include all such modifications and variations within the scope of their invention which is defined by the following claims.

We claim:

1. A process for preparing gasified ice characterized by a high degree of mechanical strength in its frozen state, a high gas content, prolonged storage stability suitable for commercial distribution in its frozen state, and a vigorous, uniform effervesence when placed in water, which comprises:
   (a) contacting water ice with a conditionally-stable-hydrate-forming gas under conditions of temperature and pressure capable of forming a hydrate complex of the gas, said temperature being below the freezing point of water and said pressure being at least sufficient to enable formation of said hydrate but insufficient to liquefy said gas at the temperature of contact;
   (b) maintaining said contact for a period of time effective to form gas hydrate complex within said ice;
   (c) contacting said water ice containing gas hydrate, under conditions of temperature and pressure effective to maintain said hydrate in stable form, with a sufficient amount of aqueous liquid to wet all exposed surfaces of said ice; and
   (d) freezing said aqueous liquid to enrobe said gas hydrate ice.

2. A process according to claim 1 wherein said aqueous liquid comprises a solution saturated with the conditionally-stable-hydrate-forming gas.

3. A process according to claim 1 wherein contact between the ice containing gas hydrate and the aqueous liquid is achieved by immersing the ice containing gas hydrate in the aqueous liquid under conditions of temperature and pressure effective to maintain the hydrate in stable form.

4. A process according to claim 3 which includes the further step of agitating the aqueous liquid sufficiently to wet all exposed surfaces of the gas hydrate ice prior to freezing said aqueous liquid to enrobe the gas hydrate ice.

5. A process according to claim 4 wherein said aqueous liquid comprises a solution saturated with the conditionally-stable-hydrate-forming gas.

6. A process according to claim 1 wherein the gas comprises a member selected from the group consisting of carbon dioxide, carbon monoxide, nitrous oxide, hydrogen sulfide, chlorine, methylene chloride, helium, argon, krypton and neon.

7. A process according to claim 6 wherein the gas comprises carbon dioxide.

8. A process according to claim 7 wherein said aqueous liquid comprises a solution saturated with carbon dioxide.

9. A process according to claim 8 wherein contact between the ice containing carbon dioxide hydrate and the aqueous liquid is achieved by immersing the ice containing carbon dioxide hydrate in the aqueous liquid under conditions of temperature and pressure effective to maintain the hydrate in stable form.

10. A process according to claim 9 which includes the further step of agitating the aqueous liquid sufficiently to wet all exposed surfaces of said ice prior to freezing.

11. A process according to claim 7 wherein said contact between the ice and the carbon dioxide is conducted at a temperature within the range of from about $-20°$ to about $0°$ C. at a pressure of from about 0.3 to 0.99 times the vapor pressure of carbon dioxide at the temperature of contact.

12. A process according to claim 11 wherein the ice exhibits a specific surface of greater than about 80 square centimeters per gram of bulk ice.

13. A process according to claim 12 wherein the ice exhibits a specific surface of greater than about 1500 square centimeters per gram of bulk ice.

14. A process according to claim 11 wherein the contact between the ice and the carbon dioxide gas is maintained for a period of time sufficient to obtain a carbon dioxide content of at least 25 milliliters per gram of solid ice.

15. A process according to claim 11 wherein the temperature during contact between the ice and the carbon dioxide gas is maintained within the range of from $-14°$ C. to $-2°$ C.

16. A product prepared according to the process of claims 1 or 15.

* * * * *